Apr. 24, 1923.
A. L. ANDREA
1,452,586
APPARATUS FOR DESICCATING FOOD
Filed July 1, 1920
2 Sheets-Sheet 2
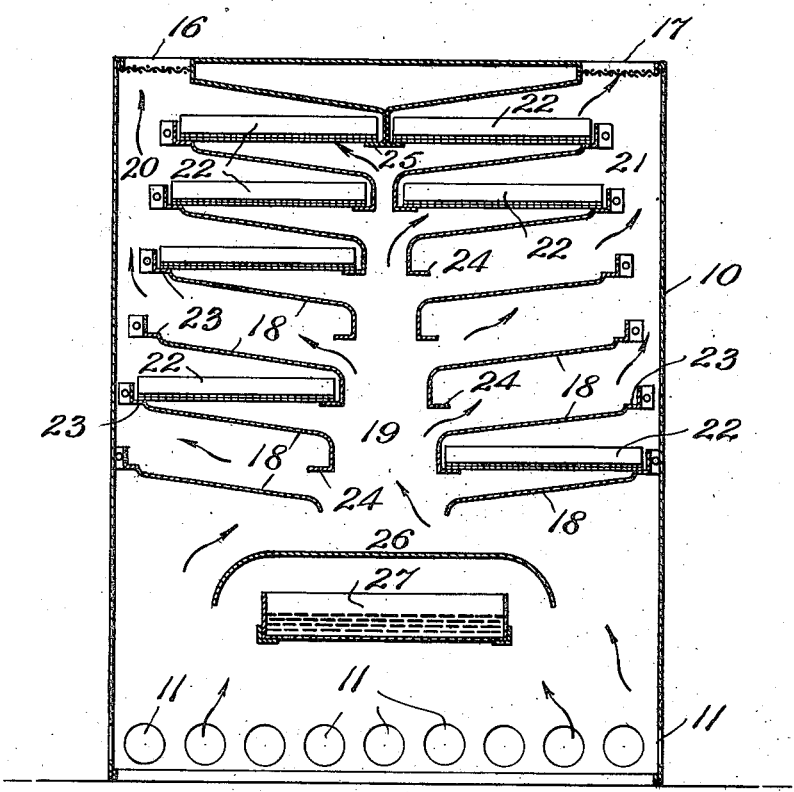

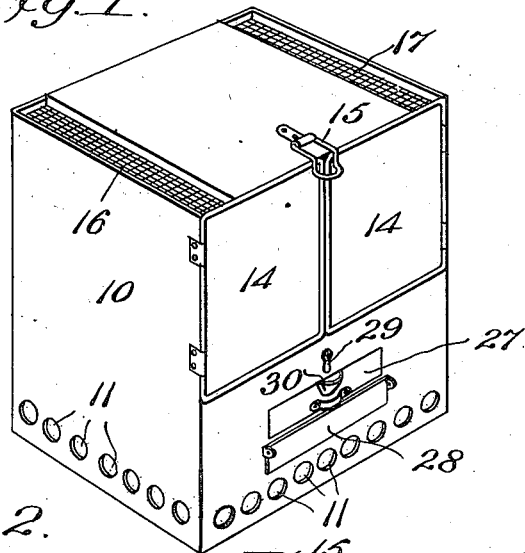
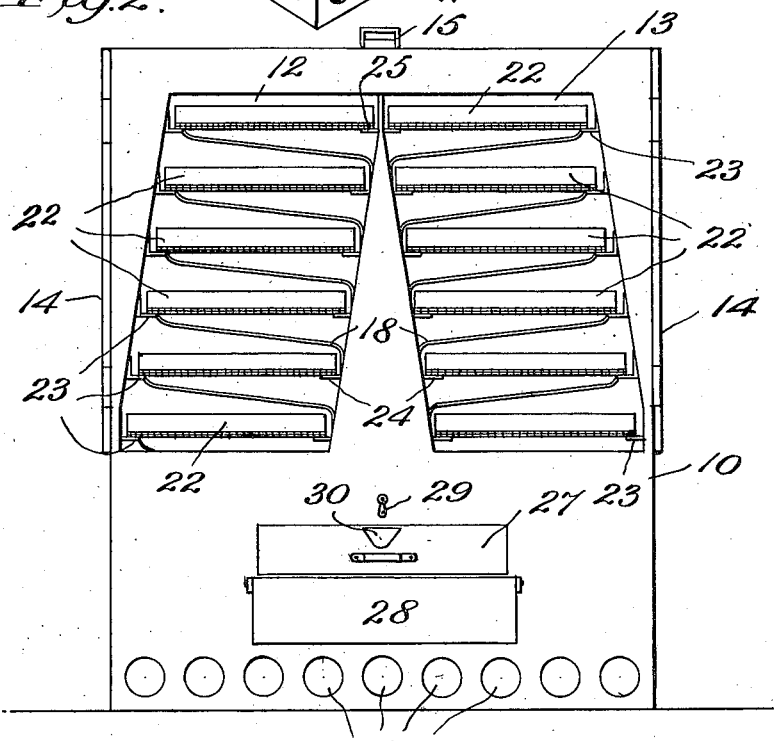

Patented Apr. 24, 1923.

1,452,586

UNITED STATES PATENT OFFICE.

AGNES LOUISE ANDREA, OF NEW YORK, N. Y., ASSIGNOR TO NICHOLS DEHYDRATOR CORPORATION, A CORPORATION OF DELAWARE.

APPARATUS FOR DESICCATING FOOD.

Application filed July 1, 1920. Serial No. 393,246.

*To all whom it may concern:*

Be it known that I, AGNES LOUISE ANDREA, a citizen of the United States, residing in New York, State and county of New York, have invented a certain Improvement in Apparatus for Desiccating Food, of which the following is a specification.

The present invention relates to an improved apparatus for dehydrating foods for their preservation.

The principal object of the invention is the provision of a simple, economical and reliable apparatus whereby foods of various kinds may be desiccated, under conditions permitting of the introduction of water vapor during a part or all of the process, and whereby the amount of water vapor and the period of its application can be easily regulated.

Apparatus for carrying out the process in question and embodying the invention is illustrated by way of example in the accompanying drawings wherein Figure 1 is a perspective view of the exterior of a domestic dryer supplied with my invention, Figure 2 is a front elevation of the same with the front doors removed and Figure 3 is an elevation with the entire front removed.

While the invention may be employed for large industrial apparatus, I have shown it in the drawings as embodied in a form convenient for domestic use, and capable of employment by merely standing it on the top of a stove or over a gas flame.

For this purpose an outer casing 10 is provided, which may have air admission openings 11 around its lower edges. In front are two openings 12 and 13, closed by doors 14 secured by a catch 15 or otherwise. There are openings 16 and 17 on opposite sides of the top plate, preferably covered with wire mesh.

From front to back of the device opposite the openings 12 and 13 are fixed inclined plates 18, so that there is formed within the device a central inlet flue 19 preferably narrowing toward the top; and two lateral flues, 20 and 21, which widen upward and terminate at the openings 16 and 17, each of these latter flues communicating with the central flue through independent lateral passages formed by the plates 18.

The material to be dried is placed upon shelves 22 constructed in the usual manner, whose edges slide upon horizontal ledges 23 and 24 formed in the plates 18, and adapted to be drawn forward through the openings 12 and 13 when the doors 14 are opened. The rests 25 at the top of the central flue 19 receive the inner edges of the topmost trays 22.

Immediately beneath the bottom of the central flue is placed a substantially horizontal baffle plate 26, so that, when the apparatus is set over the source of heat, the air rising against said plate flows outward laterally and then finds its way indirectly to the flue 19, thence through the independent lateral passages where it acts upon the food on the trays 22, and out through the openings 16 and 17.

In order to supply the temporary moisture to the drying air in the manner above set forth, a shallow water reservoir or tray 27 is introduced into the path of the ascending air. This is preferably in the form of a sliding drawer just under the baffle plate 26. When the moistening process is over, this drawer can be pulled out, and the opening may be closed in any convenient manner, as by the swinging flap 28 and catch 29. If desired, a funnel 30 may be used to fill the drawer from the outside. The reservoir 27 need not, of course, be made removable, and its size, shape and position may be varied without departing from the invention.

When using the apparatus a quantity of hot water is placed in the reservoir 27, and is left exposed to the rising current of hot air for a period which can be best determined by experiment for special cases, but should in general be about one third of the time necessary for complete desiccation. In some cases, particularly when the reservoir is not made removable, a stated total quantity of water, experimentally determined, is placed in the reservoir and is allowed entirely to evaporate. Of course, it is not essential to the invention considered as an improved process, to supply the preliminary moisture in the manner shown. Any mode of introducing water vapor during the early stages will be within the invention.

It is found that, by resorting to the expedient described, a premature drying and hardening of the outer layers of the food treated is prevented, so that the later stages, carried on with thoroughly dry air, will be effective all the way through the material.

What is claimed is—

1. Apparatus for the purpose described comprising a casing having separate drying passages leading from a single main inlet flue, trays for the material located in said passages, and a water reservoir located under the inlet flue.

2. Apparatus of the character set forth in claim 1 hereof wherein the trays are held in separate passages leading in two directions from a central supply flue and wherein the water reservoir is located under the central flue.

3. Apparatus of the character set forth in claim 1 hereof wherein a baffle plate is set over the reservoir.

4. Apparatus of the character set forth in claim 1 hereof wherein the reservoir takes the form of a drawer adapted to be slid in and out of operating position.

5. Apparatus of the character set forth in claim 1 hereof wherein the reservoir is provided with an external funnel 30.

6. Apparatus of the character set forth in claim 1 hereof wherein the reservoir takes the form of a slidable drawer and wherein an exterior flap is provided adapted to close the opening caused by removal of said drawer.

In testimony whereof I have hereto set my hand on this 29th day of June, 1920.

AGNES LOUISE ANDREA.